United States Patent
Choi et al.

(10) Patent No.: US 10,859,802 B2
(45) Date of Patent: Dec. 8, 2020

(54) REFLECTION PHASE MICROSCOPE HAVING SCANNING MIRROR AND FIRST AND SECOND WAVEPLATES

(71) Applicant: KOREA UNIVERSITY RESEARCH AND BUSINESS FOUNDATION, Seoul (KR)

(72) Inventors: Youngwoon Choi, Seoul (KR); Beop-Min Kim, Seoul (KR); Min Gyu Hyeon, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 141 days.

(21) Appl. No.: 16/173,533

(22) Filed: Oct. 29, 2018

(65) Prior Publication Data

US 2019/0310452 A1  Oct. 10, 2019

(30) Foreign Application Priority Data

Apr. 6, 2018 (KR) ........................ 10-2018-0040624

(51) Int. Cl.
*G02B 21/00* (2006.01)
*G02B 21/04* (2006.01)
(Continued)

(52) U.S. Cl.
CPC ..... *G02B 21/0068* (2013.01); *G02B 21/0032* (2013.01); *G02B 21/0048* (2013.01);
(Continued)

(58) Field of Classification Search
CPC .. G02B 21/002; G02B 21/0092; G02B 21/14; G02B 21/18; G02B 21/26; G02B 21/34;
(Continued)

(56) References Cited

U.S. PATENT DOCUMENTS

| 6,043,932 | A | * | 3/2000 | Kusunose | ............ | G02B 21/002 |
| | | | | | | 359/368 |
| 6,091,496 | A | * | 7/2000 | Hill | ...................... | G02B 21/004 |
| | | | | | | 356/491 |
| 2016/0377546 | A1 | * | 12/2016 | Ragan | ...................... | G01J 1/44 |
| | | | | | | 250/459.1 |

FOREIGN PATENT DOCUMENTS

| KR | 10-1053222 B1 | 8/2011 |
| KR | 10-2013-0084718 A | 7/2013 |

OTHER PUBLICATIONS

Korean Office Action dated Jan. 2, 2019 in corresponding Korean Patent Application No. 10-2018-0040624 (4 pages in Korean).

* cited by examiner

*Primary Examiner* — Ryan S Dunning
(74) *Attorney, Agent, or Firm* — NSIP Law

(57) ABSTRACT

A reflection phase microscope is disclosed. The reflection phase microscope includes: a light source unit irradiating light; a polarization beam splitter splitting the light irradiated from the light source unit into a sample beam and a reference beam; a sample unit reflecting the sample beam toward the polarization beam splitter; a reference mirror reflecting the reference beam toward the polarization beam splitter; a scanning mirror adjusting the angle of incidence of the light from the light source unit on the polarization beam splitter such that the angle of incidence of the sample beam on the sample unit and the angle of incidence of the reference beam on the reference mirror are adjusted; a diffraction grating diffracting the sample beam reflected by the sample unit and the reference beam reflected by the reference mirror; and an image acquisition unit receiving the beams diffracted by the diffraction grating.

7 Claims, 2 Drawing Sheets

(51) Int. Cl.
  *G02B 21/24* (2006.01)
  *G03H 1/00* (2006.01)
(52) U.S. Cl.
  CPC ............ *G02B 21/04* (2013.01); *G02B 21/241* (2013.01); *G03H 2001/005* (2013.01)
(58) Field of Classification Search
  CPC .. G02B 21/361; G02B 21/362; G02B 21/365; G02B 21/367; G03H 2001/005; G03H 2001/0228; G03H 2001/0445; G03H 2001/045; G03H 2001/0452; G03H 1/0866; G03H 2001/0469; G03H 2223/22; G03H 2223/23
  USPC .......................... 359/370, 371, 372, 386, 392
  See application file for complete search history.

REFLECTION PHASE MICROSCOPE HAVING SCANNING MIRROR AND FIRST AND SECOND WAVEPLATES

CROSS REFERENCE TO RELATED APPLICATION(S)

This application claims the benefit under 35 USC 119(a) of Korean Patent Application No. 10-2018-0040624 filed on Apr. 6, 2018 in the Korean Intellectual Property Office, the entire disclosure of which is incorporated herein by reference for all purposes.

BACKGROUND OF THE INVENTION

1. Field of the Invention

The present invention relates to a reflection phase microscope, and more specifically to a reflection phase microscope using a digital holographic technique.

2. Description of the Related Art

Digital holography is an imaging technique that acquires information on both the intensity and phase of light from a target object based on light interference. For the acquisition of phase information, light from a light source is split into a sample beam and a reference beam. The sample beam is allowed to interact with a sample and the reference beam is allowed to pass through a space where the sample is absent. The two beams are combined in an image sensor to form an interference pattern, which is then analyzed to acquire phase information.

Methods for causing interference between the two beams in the image sensor are broadly divided into two methods. One is to allow the sample beam and the reference beam to meet each other in parallel and is commonly known as a "collinear configuration". The other is to allow the sample beam and the reference beam to meet each other at an angle to form an interference pattern and is known as an "off-axis configuration".

Generally, microscopes are classified into transmission-type quantitative phase microscopes acquiring information on the phase of light transmitted through a sample and reflection-type quantitative phase microscopes acquiring information on the phase of light reflected by a sample. Reflection-type quantitative phase microscopes have higher phase sensitivity than transmission-type quantitative phase microscopes due to their ability to directly acquire the phase of light reflected from the surface of sample. Thus, research aimed at further improving the performance of reflection phase microscopes is currently underway.

SUMMARY OF THE INVENTION

It is an object of the present invention to provide a reflection phase microscope using a digital holographic technique.

Objects of the present invention are not limited to the above-mentioned object, and those skilled in the art will clearly understand unmentioned other objects from the following description.

A reflection phase microscope of the present invention may include: a light source unit irradiating light; a polarization beam splitter splitting the light irradiated from the light source unit into a sample beam and a reference beam; a sample unit reflecting the sample beam toward the polarization beam splitter; a reference mirror reflecting the reference beam toward the polarization beam splitter; a scanning mirror adjusting the angle of incidence of the light from the light source unit on the polarization beam splitter such that the angle of incidence of the sample beam on the sample unit and the angle of incidence of the reference beam on the reference mirror are adjusted; a diffraction grating diffracting the sample beam reflected by the sample unit and the reference beam reflected by the reference mirror; and an image acquisition unit receiving the beams diffracted by the diffraction grating.

In one embodiment, the reflection phase microscope may further include a first wave plate vertically polarizing the sample beam reflected by the sample unit and incident on the polarization beam splitter and a second wave plate vertically polarizing the reference beam reflected by the reference mirror and incident on the polarization beam splitter.

In one embodiment, the reflection phase microscope may further include a first polarizer through which only the sample beam diffracted by the diffraction grating is allowed to pass, a second polarizer through which only the reference beam diffracted by the diffraction grating is allowed to pass, and third wave plates matching the polarized sample beam having passed through the first polarizer to the polarized reference beam having passed through the second polarizer.

In one embodiment, the third wave plates may include a first sub-wave plate polarizing the sample beam and a second sub-wave plate polarizing the reference beam, the first sub-wave plate may have a polarization axis of 45°, and the second sub-wave plate may have a polarization axis of −45°.

In one embodiment, the polarized sample beam having passed through the first polarizer and the polarized reference beam having passed through the second polarizer may cross each other.

In one embodiment, the reflection phase microscope may further include a first objective lens disposed between the sample unit and the first wave plate to focus the sample beam incident on the sample and a second objective lens disposed between the reference mirror and the second wave plate to focus the reference beam incident on the reference mirror.

In one embodiment, the scanning mirror may adjust the angle of incidence of the sample beam on the sample unit to cover the numerical apertures of the first objective lens and the second objective lens.

In one embodiment, the reflection phase microscope may further include a light intensity-adjusting wave plate disposed between the scanning mirror and the polarization beam splitter to adjust the intensity of the reference beam incident on the reference mirror and the intensity of the sample beam incident on the sample unit.

Specific details of other embodiments are included in the detailed description and the accompanying drawings.

According to the embodiments of the present invention, the angle of incidence of light on a sample is variably set and the full numerical apertures of the objective lenses are used for imaging so that the reflection phase microscope enables imaging of a wide area of the sample and has improved longitudinal resolution. In addition, diffraction noise is reduced, allowing the reflection phase microscope to acquire high spatial resolution. As a result, improved image quality can be achieved. Furthermore, the reflection phase microscope can use an off-axis technique to improve the image acquisition speed.

Effects of the present invention are not limited to the above-mentioned effects and other effects not mentioned above may be clearly understood by those skilled in the art from the description of the claims.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
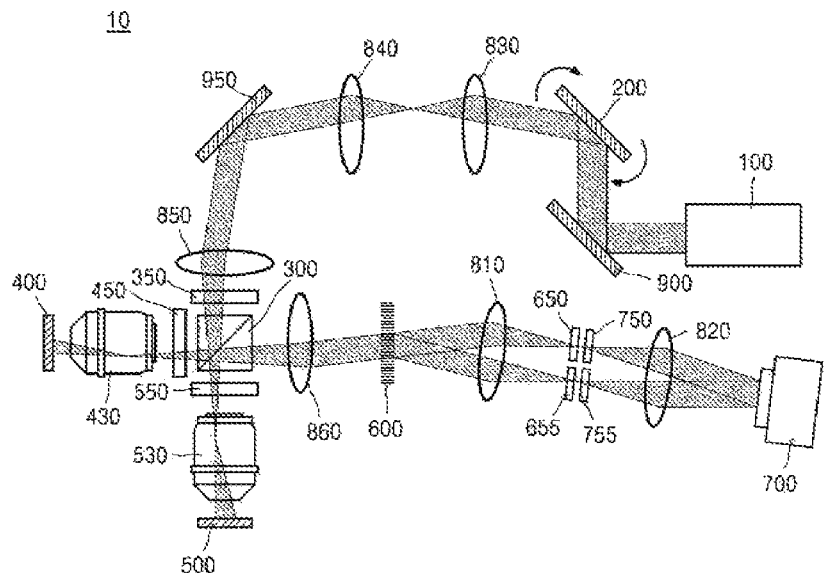
FIG. 1 is a schematic diagram of a reflection phase microscope according to one embodiment of the present invention.

The advantages and features of the present invention and methods for achieving them will become more apparent from the following embodiments described in detail below in conjunction with the accompanying drawings. However, the present invention is not limited to the illustrated embodiments and may be embodied in various different forms. Rather, the disclosed embodiments are provided so that the disclosure of the present invention will be thorough and complete, and will fully convey the scope of the invention to those skilled in the art to which the present invention pertains. The scope of the present invention is defined by the claims that follow. Like reference numerals indicate like elements throughout the specification.

The embodiments described herein will be described with sectional and/or plan views as ideal exemplary views of the present invention. In the drawings, the thicknesses of layers and regions are exaggerated for clarity of illustration. Thus, the regions illustrated in the figures are schematic in nature and their shapes are not intended to illustrate the precise shape of a region of a device and are not intended to limit the scope of the present invention. It will be understood that, although the terms first, second, third, etc. may be used herein to describe various elements, these elements should not be limited by these terms. These terms are only used to distinguish one element from another. The embodiments described herein also include complementary embodiments thereof.

The terms used in the present application are merely used to describe particular embodiments, and are not intended to limit the present invention. As used herein, the singular forms "a", "an" and "the" are intended to include the plural forms as well, unless the context clearly indicates otherwise. It will be further understood that the terms "comprises (includes)" and/or "comprising (including)" when used in this specification, specify the presence of stated elements, steps, operations, and/or components, but do not preclude the presence or addition of one or more other elements, steps, operations, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, will not be interpreted in an idealized or overly formal sense unless expressly so defined herein.

The concepts of the present invention and their embodiments will now be described in detail with reference to the accompanying drawings.

FIG. 1 is a schematic diagram of a reflection phase microscope according to one embodiment of the present invention.

Referring to FIG. 1, the reflection phase microscope 10 may be based on digital holography. The reflection phase microscope 10 may include a light source unit 100, a polarization beam splitter 300, a sample unit 500, a reference mirror 400, a scanning mirror 200, a diffraction grating 600, and an image acquisition unit 700. The reflection phase microscope 10 may further include a first wave plate 550, a second wave plate 450, third wave plates 750 and 755, a first polarizer 650, a second polarizer 655, a first objective lens 530, a second objective lens 430, a light intensity-adjusting wave plate 350, a plurality of reflective mirrors 900 and 950, and a plurality of lenses 810 to 860.

The light source unit 100 can irradiate light. In an embodiment, the light source unit 100 may irradiate laser light. However, light irradiated from the light source unit 100 is not limited to laser light. For example, the light source unit 100 may be a Ti:sapphire laser source. In an embodiment, laser light irradiated from the Ti:sapphire laser source may have a central wavelength ($\lambda_o$) of about 700 nm and a spectral width ($\Delta\lambda$) of ≈6 nm. In an alternative embodiment, the laser light irradiated from the Ti:sapphire laser source may have a central wavelength ($\lambda_o$) of about 800 nm and a spectral width ($\Delta\lambda$) of ≈17 nm.

The plurality of reflective mirrors 900 and 950 may include a first reflective mirror 900 and a second reflective mirror 950. The first reflective mirror 900 may be disposed between the light source unit 100 and the polarization beam splitter 300. The first reflective mirror 900 can reflect the laser light irradiated from the light source unit 100 toward the polarization beam splitter 300. The second reflective mirror 950 will be described below.

The polarization beam splitter 300 can split the laser light irradiated from the light source unit 100 into a sample beam and a reference beam. The sample beam may be the laser light having transmitted through the polarization beam splitter 300. The reference beam may be the light reflected by the polarization beam splitter 300.

The sample unit 500 can reflect the sample beam having transmitted through the polarization beam splitter 300 toward the polarization beam splitter 300. The sample unit 500 may include a sample and a sample mirror. The sample mirror can support the sample. The sample mirror can be used to vary the position of the sample. For example, the sample mirror can be moved toward or away from the polarization beam splitter 300, with the result that the distance between the sample and the polarization beam splitter 300 may decrease or increase.

The first wave plate 550 may be disposed between the sample unit 500 and the polarization beam splitter 300. The first wave plate 550 can vertically polarize the sample beam reflected by the sample unit 500 and incident on the polarization beam splitter 300. For example, the first wave plate 550 may change the polarization direction of the sample beam irradiated from the polarization beam splitter 300 toward the sample unit 500 by 45°. The first wave plate 550 may change the polarization direction of the sample beam reflected by the sample unit 500 and incident on the polarization beam splitter 300 by 45°. Thus, the polarized sample beam reflected by the sample and incident on the polarization beam splitter 300 may be perpendicular to the polarized sample beam incident on the sample from the polarization beam splitter 300.

The first objective lens 530 may be disposed between the sample unit 500 and the first wave plate 550. The first objective lens 530 can focus the sample beam incident on the sample unit 500. The sample beam focused by the first objective lens 530 may be incident on the sample of the sample unit 500.

The reference mirror 400 can reflect the reference beam reflected by the polarization beam splitter 300 toward the polarization beam splitter 300. The reference mirror 400 may be positionally fixed.

The second objective lens 430 may be disposed between the reference mirror 400 and the second wave plate 450. The second objective lens 430 can focus the reference beam incident on the reference mirror 400. The reference beam focused by the second objective lens 430 may be incident on the reference mirror 400.

The second wave plate 450 may be disposed between the reference mirror 400 and the polarization beam splitter 300. The second wave plate 450 can vertically polarize the reference beam reflected by the reference mirror 400 and incident on the polarization beam splitter 300. For example, the second wave plate 450 may change the polarization direction of the reference beam irradiated from the polarization beam splitter 300 toward the reference mirror 400 by 45°. The second wave plate 450 may change the polarization direction of the sample beam reflected by the reference mirror 400 and incident on the polarization beam splitter 300 by 45°. Thus, the polarized reference beam reflected by the reference mirror 400 and incident on the polarization beam splitter 300 may be perpendicular to the polarized reference beam incident on the reference mirror 400 from the polarization beam splitter 300. In one embodiment, the polarized sample beam having passed through the first polarizer 550 and the polarized reference beam having passed through the second polarizer 450 may cross each other.

The light intensity-adjusting wave plate 350 may be disposed between the scanning mirror 200 and the polarization beam splitter 300. Specifically, the light intensity-adjusting wave plate 350 may be disposed between the reflective mirror 950 and the polarization beam splitter 300. The light intensity-adjusting wave plate 350 can adjust the intensity of the reference beam incident on the reference mirror 400 and the intensity of the sample beam incident on the sample unit 500. In an embodiment, the light intensity-adjusting wave plate 350 may be a half wave plate. The half wave plate can change the polarization direction of the light incident on the polarization beam splitter 300 from the scanning mirror 200 by 90°.

The scanning mirror 200 can adjust the angle of incidence of the light on the polarization beam splitter 300 from the light source unit 100. For example, the scanning mirror 200 may reflect the light reflected by the first reflective mirror 900 toward the second reflective mirror 950. Here, the scanning mirror 200 can adjust the angle of the light reflected toward the second reflective mirror 950. That is, the rotation angle of the scanning mirror 200 is controlled such that the angle of the light reflected toward the second reflective mirror 950 is adjusted. The second reflective mirror 950 can reflect the light reflected by the scanning mirror 200 toward the polarization beam splitter 300. The scanning mirror 200 can adjust the angle of incidence of the sample beam on the sample unit 500 from the polarization beam splitter 300. The scanning mirror 200 can adjust the angle of incidence of the reference beam on the reference mirror 400 from the polarization beam splitter 300. For example, the scanning mirror 200 may adjust at least three times the angles of incidence of the beams on the sample unit 500 and the reference mirror 400. The maximum angle of incidence of the beam on the sample unit 500 can cover the full numerical apertures of the first objective lens 530 and the second objective lens 430. The scanning mirror 200 can perform a spiral scan to cover the full numerical apertures of the first objective lens 530 and the second objective lens 430. Thus, diffraction noise of an image acquired by the image acquisition unit 700 is reduced, allowing the reflection phase microscope to acquire high spatial resolution.

In an embodiment, the scanning mirror 200 may be a 2-axis galvano scanner but is not limited thereto. The diffraction grating 600 may be disposed between the image acquisition unit 700 and the polarization beam splitter 300. In an embodiment, the beams incident on the image acquisition unit 700 from the polarization beam splitter 300 may be diffracted by the diffraction grating 600. Thus, the light source unit 100 may use an off-axis technique.

The diffraction grating 600 can diffract the sample beam reflected by the sample unit 500. For example, the sample beam reflected by the sample unit 500 may be reflected substantially vertically by the polarization beam splitter 300 and may be incident on the diffraction grating 600. The diffraction grating 600 can diffract the reference beam reflected by the reference mirror 400. For example, the reference beam reflected by the reference mirror 400 may be incident on the diffraction grating 600 through the polarization beam splitter 300. That is, both the reference beam and the sample beam may be incident on the diffraction grating 600.

The sample beam and the reference beam having passed through the diffraction grating 600 may be split into several beams by diffraction. For example, the several beams non-diffracted (zero-order) and primarily (first-order) diffracted by the diffraction grating 600 may include the sample beam and the reference beam. In an embodiment, the diffraction grating 600 may be a two-dimensional shape in the XY-plane.

The beams diffracted by the diffraction grating 600 can be transmitted through a first lens 810 and a second lens 820 disposed between the diffraction grating 600 and the image acquisition unit. The first lens 810 and the second lens 820 may be spaced apart from each other. In an embodiment, the plurality of lenses may further include third to sixth lens 830 to 860.

The first polarizer 650 and the second polarizer 655 may be disposed between the first lens 810 and the second lens 820. For example, each of the first and second polarizers 650 and 655 may be disposed in a focusing plane (e.g., Fourier plane (FP)) between the first lens 810 and the second lens 820. In an embodiment, each of the first and second polarizers 650 and 655 may be a linear polarizer through which only light parallel to a polarization axis passes but is not limited thereto.

The third and fourth lenses 830 and 840 may be disposed between the scanning mirror 200 and the second reflective mirror 950. The fifth lens 850 may be disposed between the polarization beam splitter 300 and the second reflective mirror 950. The sixth lens 860 may be disposed between the polarization beam splitter 300 and the diffraction grating 600. The third to sixth lenses 830 to 860 allow light to be transmitted therethrough.

The first polarizer 650 allows only the sample beam diffracted by the diffraction grating 600 and parallel to a first polarization axis to be transmitted therethrough. The second polarizer 655 allows only the reference beam diffracted by the diffraction grating 600 and parallel to a second polarization axis to be transmitted therethrough. As a result, the reference beam diffracted by the diffraction grating 600 cannot pass through the first polarizer 650 and the sample beam diffracted by the diffraction grating 600 cannot pass through the second polarizer 655.

The third wave plates 750 and 755 may be disposed between the first and the second polarizers 650 and 655 and the image acquisition unit 700, respectively. The third wave plates 750 and 755 can match the polarized sample beam having passed through the first polarizer 650 to the polarized reference beam having passed through the second polarizer 655. In an embodiment, the third wave plates 750 and 755 may include a first sub-wave plate 750 and a second sub-wave plate 755.

The first sub-wave plate 750 may be disposed between the first polarizer 650 and the image acquisition unit 700. The first sub-wave plate 750 can polarize the sample beam having passed through the first polarizer 650. The second sub-wave plate 755 may be disposed between the second polarizer 655 and the image acquisition unit 700. The second sub-wave plate 755 can polarize the reference beam having passed through the second polarizer 655. The first sub-wave plate 750 may have a polarization axis of 45° and the second sub-wave plate 755 may have a polarization axis of −45°. Thus, the polarized sample beam having passed through the first sub-wave plate 750 may be matched to the polarized reference beam having passed through the second sub-wave plate 755. For example, the polarized sample beam having passed through the first sub-wave plate 750 and the polarized reference beam having passed through the second sub-wave plate 755 may have the same circular polarization and can cause interference in front of the image acquisition unit 700.

The image acquisition unit 700 can receive the beams diffracted by the diffraction grating 600 to acquire an image. In an embodiment, the image acquisition unit 700 may be an image sensor or CCD but is not limited thereto.

Figure 2:
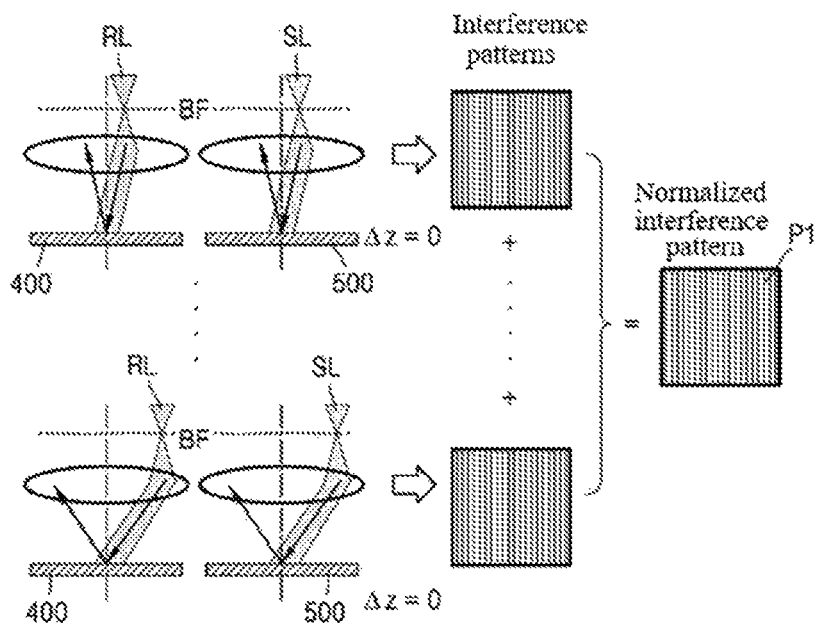
FIGS. 2 and 3 show normalized interference patterns according to the movement of a sample unit of the reflection phase microscope of FIG. 1.
Figure 3:
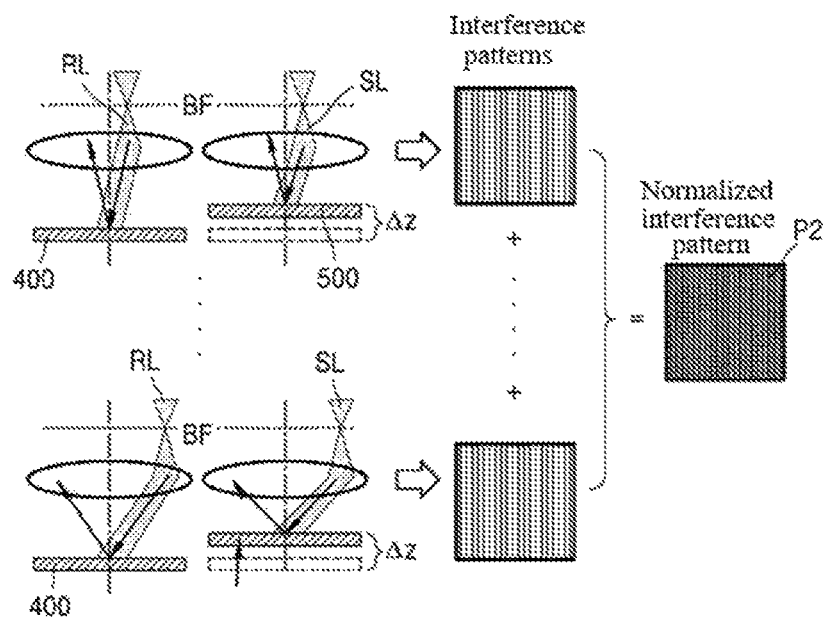
Figure 4:
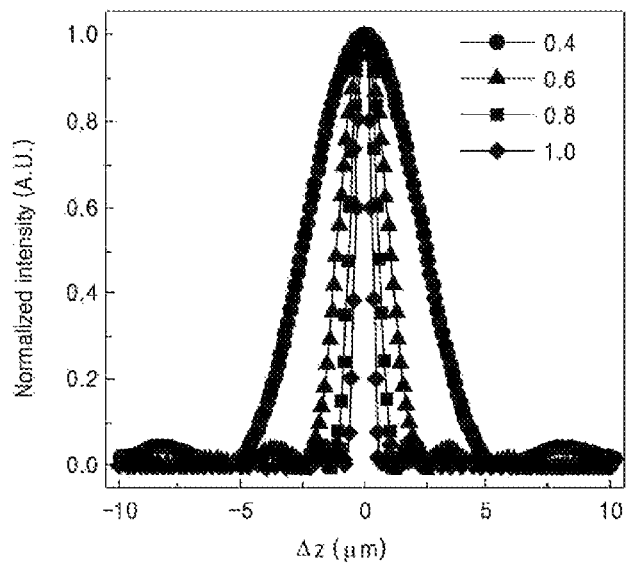
FIG. 4 is a graph showing the intensities of normalized interference signals according to the movement of a sample unit of the reflection phase microscope of FIG. 1.

FIGS. 2 and 3 show normalized interference patterns according to the movement of the sample unit of the reflection phase microscope of FIG. 1 and FIG. 4 is a graph showing the intensities of normalized interference signals according to the movement of the sample unit of the reflection phase microscope of FIG. 1. In FIG. 4, the number of each figure indicates the numerical aperture of the first objective lens.

Referring to FIGS. 1 to 4, the first distance between the sample unit 500 (hereinafter referred to as "sample mirror") and the polarization beam splitter 300 (see FIG. 1) may be the same as the second distance between the reference mirror 400 and the polarization beam splitter 300, that is, Δz (μm)=0 where Δz is the difference between the first distance and the second distance. The sample mirror may be moved at intervals of about 100 nm in the range of −10 μm≤Δz≤10 μm. The reference mirror 400 may be positionally fixed.

As shown in FIGS. 2 and 4, the first distance may be identical to the second distance, that is, Δz (μm)=0. The reference beam RL may be incident at an angle on the reference mirror 400 and the sample beam SL may be incident at an angle on the sample unit 500. The reference beam RL reflected by the reference mirror 400 and the sample beam SL reflected by the sample unit 500 may form an interference pattern P1 in front of the image acquisition unit 700 (see FIG. 1).

For example, the reference beam RL reflected by the reference mirror 400 and the sample beam SL reflected by the sample unit 500 may form an interference pattern P1 by an off-axis technique. Off-axis holography refers to a technique in which a reference wavefront is allowed to be incident at a certain angle with respect to a sample wavefront and the resulting hologram is recorded. When the angle of incidence of the reference beam RL on the reference mirror 400 and the angle of incidence of the sample beam SL on the sample unit 500 are changed and Δz (μm) is 0, the contrast of the interference pattern P1 can be made clear.

The normalized intensity of the interference pattern may be the highest when Δz (μm) is approximately 0. The longitudinal resolution may increase with increasing numerical aperture of the first objective lens 530 (see FIG. 1). For example, when the numerical aperture of the first objective lens 530 is 1, the longitudinal resolution may be approximately 660 nm. When the numerical aperture of the first objective lens 530 is 1, it indicates that the full numerical aperture of the first objective lens 530 is utilized.

As shown in FIGS. 3 and 4, the position of the sample mirror of the sample unit 500 may be changed, that is, Δz (μm)≠0. The reference beam RL may be incident at an angle on the reference mirror 400 and the sample beam SL may be incident at an angle on the sample unit 500. The reference beam RL reflected by the reference mirror 400 and the sample beam SL reflected by the sample unit 500 may form an interference pattern P2 in front of the image acquisition unit 700 (see FIG. 1). Here, the contrast of the interference pattern P2 may be weakened. The normalized intensity of the interference pattern at Δz (μm)≠0 may be lower than that of the interference pattern P2 at Δz (μm)=0.

The reflection phase microscope 10 can analyze the normalized interference patterns P1 and P2 to acquire information on the amplitude and phase of the beam reflected by the sample. Thus, the reflection phase microscope 10 can acquire information on the structure of the sample. For example, the reflection phase microscope 10 may acquire two-dimensional (2D) images of the sample while moving the position of the sample through the sample mirror. The reflection phase microscope 10 can create a three-dimensional (3D) image based on the acquired 2D images.

Although the present invention has been particularly shown and described with reference to preferred embodiments thereof, it is not limited to the embodiments and it will be understood by those skilled in the art that various modifications are possible without departing from the gist of the present invention as defined from by the appended claims and such modifications should not be individually understood from the technical spirit or prospect of the present invention.

What is claimed is:

1. A reflection phase microscope comprising:
a light source unit irradiating light;
a polarization beam splitter splitting the light irradiated from the light source unit into a sample beam and a reference beam;
a sample unit reflecting the sample beam toward the polarization beam splitter;
a reference mirror reflecting the reference beam toward the polarization beam splitter;
a scanning mirror adjusting an angle of incidence of the light from the light source unit on the polarization beam splitter such that an angle of incidence of the sample beam on the sample unit and an angle of incidence of the reference beam on the reference mirror are adjusted;

a diffraction grating diffracting the sample beam reflected by the sample unit and the reference beam reflected by the reference mirror;

an image acquisition unit receiving the sample beams and the reference beam diffracted by the diffraction grating;

a first wave plate polarizing the sample beam reflected by the sample unit; and a second wave plate polarizing the reference beam reflected by the reference mirror, wherein the sample beam polarized by the first wave plate is incident on the polarization beam splitter, wherein the polarized sample beam incident on the polarization beam splitter is perpendicular to the sample beam split by the polarization beam splitter, wherein the reference beam polarized by the second wave plate is incident on the polarization beam splitter, and wherein the polarized reference beam incident on the polarization beam splitter is perpendicular to the reference beam split by the polarization beam splitter.

2. The reflection phase microscope according to claim 1, further comprising a first polarizer through which only the sample beam diffracted by the diffraction grating is allowed to pass, a second polarizer through which only the reference beam diffracted by the diffraction grating is allowed to pass, and third wave plates matching the polarized sample beam having passed through the first polarizer to the polarized reference beam having passed through the second polarizer.

3. The reflection phase microscope according to claim 2, wherein the third wave plates comprise a first sub-wave plate polarizing the sample beam and a second sub-wave plate polarizing the reference beam, the first sub-wave plate has a polarization axis of 45°, and the second sub-wave plate has a polarization axis of −45°.

4. The reflection phase microscope according to claim 1, wherein the polarized sample beam having passed through the first polarizer and the polarized reference beam having passed through the second polarizer cross each other.

5. The reflection phase microscope according to claim 1, further comprising a first objective lens disposed between the sample unit and the first wave plate to focus the sample beam incident on the sample and a second objective lens disposed between the reference mirror and the second wave plate to focus the reference beam incident on the reference mirror.

6. The reflection phase microscope according to claim 5, wherein the scanning mirror adjusts the angle of incidence of the sample beam on the sample unit to cover the numerical apertures of the first objective lens and the second objective lens.

7. The reflection phase microscope according to claim 1, further comprising a light intensity-adjusting wave plate disposed between the scanning mirror and the polarization beam splitter to adjust the intensity of the reference beam incident on the reference mirror and the intensity of the sample beam incident on the sample unit.

\* \* \* \* \*